United States Patent
Wong

(10) Patent No.: US 12,086,142 B2
(45) Date of Patent: Sep. 10, 2024

(54) DATABASE VIRTUAL PARTITIONING

(71) Applicant: salesforce.com, inc., San Francisco, CA (US)

(72) Inventor: Simon Y. Wong, San Carlos, CA (US)

(73) Assignee: Salesforce, Inc., San Francisco, CA (US)

( * ) Notice: Subject to any disclaimer, the term of this patent is extended or adjusted under 35 U.S.C. 154(b) by 359 days.

(21) Appl. No.: 17/162,815

(22) Filed: Jan. 29, 2021

(65) Prior Publication Data
US 2022/0121667 A1    Apr. 21, 2022

Related U.S. Application Data

(60) Provisional application No. 63/092,331, filed on Oct. 15, 2020.

(51) Int. Cl.
*G06F 16/2455* (2019.01)
*G06F 16/25* (2019.01)
*G06F 16/28* (2019.01)

(52) U.S. Cl.
CPC .. *G06F 16/24554* (2019.01); *G06F 16/24552* (2019.01); *G06F 16/256* (2019.01); *G06F 16/288* (2019.01)

(58) Field of Classification Search
None
See application file for complete search history.

(56) References Cited

U.S. PATENT DOCUMENTS

| | | | |
|---|---|---|---|
| 7,529,728 B2 | 5/2009 | Weissman et al. | |
| 8,244,714 B1 | 8/2012 | Collins et al. | |
| 8,447,745 B2 | 5/2013 | Ahuja et al. | |
| 8,510,332 B2 | 8/2013 | Ballard et al. | |
| 8,543,567 B1 | 9/2013 | Collins et al. | |
| 8,548,952 B2 | 10/2013 | Weissman et al. | |
| 8,577,918 B2 | 11/2013 | Collins et al. | |
| 8,738,590 B2 | 5/2014 | Bezar et al. | |
| 8,768,972 B1 | 7/2014 | Wong | |
| 8,930,322 B2 | 1/2015 | Weissman et al. | |

(Continued)

OTHER PUBLICATIONS

Bud Vieira, "Use PK Chunking to Extract Large Data Sets from Salesforce," Mar. 23, 2015; https://developer.salesforce.com/blogs/engineering/2015/03/use-pk-chunking-extract-large-data-sets-salesforce.html, 8 pages.

*Primary Examiner* — Polina G Peach
*Assistant Examiner* — Anugeetha Kunjithapatham
(74) *Attorney, Agent, or Firm* — Kowert, Hood, Munyon, Rankin & Goetzel, P.C.; Dean M. Munyon

(57) ABSTRACT

A database with virtual partitioning. A computer system used to implement the database receives a request for a database operation to be performed on data stored in a portion of the database, where the data has a group of logical partitions (e.g., tenants of a multi-tenant database), and where the portion of the database is not further physically partitioned. The computer system identifies a virtual partitioning scheme for the database operation, the virtual partitioning scheme defining sub-groups of the group of logical partitions. The computer system then performs the database operation for the sub-groups defined by the virtual partitioning scheme. Multiple virtual partitioning schemes can be active at the same time, and virtual partitioning schemes can be created dynamically in some instances.

20 Claims, 10 Drawing Sheets

(56) References Cited

U.S. PATENT DOCUMENTS

| | | | |
|---|---|---|---|
| 9,037,546 B2 | 5/2015 | Wong et al. | |
| 9,053,231 B2 | 6/2015 | Agrawal et al. | |
| 9,251,164 B2 | 2/2016 | Doshi et al. | |
| 9,275,033 B2 | 3/2016 | Wong et al. | |
| 9,367,431 B2 | 6/2016 | Unger et al. | |
| 9,418,077 B2 | 8/2016 | Hersans et al. | |
| 9,489,443 B1* | 11/2016 | Muniswamy-Reddy | G06F 16/27 |
| 9,558,218 B2 | 1/2017 | Dutta et al. | |
| 9,740,466 B2 | 8/2017 | Brooks et al. | |
| 9,767,133 B2 | 9/2017 | Adam et al. | |
| 10,152,508 B2 | 12/2018 | Weissman et al. | |
| 10,417,611 B2 | 9/2019 | Collins et al. | |
| 10,621,071 B2 | 4/2020 | Martin et al. | |
| 10,649,986 B2 | 5/2020 | Wong et al. | |
| 10,649,987 B2 | 5/2020 | Wong et al. | |
| 10,713,230 B2 | 7/2020 | Weissman et al. | |
| 10,803,062 B2 | 10/2020 | Wong et al. | |
| 10,963,464 B2* | 3/2021 | Eadon | G06F 16/24537 |
| 11,409,725 B1* | 8/2022 | Goyal | G06F 16/2255 |
| 11,609,933 B1* | 3/2023 | Ozen | G06F 16/2477 |
| 2008/0162544 A1 | 7/2008 | Weissman et al. | |
| 2009/0198736 A1* | 8/2009 | Shen | G06F 16/2282 |
| 2010/0030995 A1* | 2/2010 | Wang | G06F 16/2282 711/E12.001 |
| 2012/0066469 A1* | 3/2012 | Yochai | G06F 11/1448 711/170 |
| 2014/0013237 A1 | 1/2014 | Roy-Faderman et al. | |
| 2014/0025642 A1 | 1/2014 | Wong et al. | |
| 2014/0136500 A1 | 5/2014 | Wong et al. | |
| 2014/0165055 A1* | 6/2014 | Yanagisawa | G06F 9/45533 718/1 |
| 2017/0364695 A1 | 12/2017 | Wong et al. | |
| 2018/0052895 A1 | 2/2018 | Wong et al. | |
| 2018/0218031 A1 | 8/2018 | Wong et al. | |
| 2018/0268027 A1* | 9/2018 | Gold | G06F 12/0815 |
| 2020/0042538 A1* | 2/2020 | Stewart | G06F 16/278 |
| 2022/0391411 A1* | 12/2022 | Grimaldi | G06F 11/3409 |

* cited by examiner

VP1: A-E; VP2: F; VP3: G-I; VP4: J-L — 322A

VP1: A-E; VP2: F; VP3: G-H; VP4: I-K; VP5 L-M — 322B

DATABASE VIRTUAL PARTITIONING

The present application claims priority to U.S. Prov. Appl. No. 63/092,331, filed Oct. 15, 2020, which is incorporated by reference herein in its entirety.

BACKGROUND

Technical Field

This disclosure relates generally to computer database systems, and, more specifically, to virtual partitioning schemes for a group of logical partitions in a portion of a database.

Description of the Related Art

In some database schemas, a database object may be organized into multiple physical partitions, meaning that separate physical storage locations are used. For example, in a multi-tenant application implemented on an ORACLE database, tables may be arranged to be hash partitioned by the tenant id into one or more fixed physical partitions. Each of these physical partitions are statically defined. Thus, for different tenants or "orgs" accessing this table, an identifier such as an "orgid" column might be hashed in order to select the relevant physical partition. The static nature of this definition means that every tenant would stay in its assigned physical partition as long as that tenant exists. This may lead to a scenario in which the physical partitions of the database are not evenly loaded, with more than one large tenant assigned to the same physical partition.

An application will routinely run various tasks or database operations against the database. For example, an application may need to interact with a database organized into multiple physical partitions in order to run a background task. (One example of a background task is a process that collects certain statistics about usage or database structure such that a query optimizer may improve future queries.) Accordingly, an application may have code that loops through each of the physical partitions by getting a connection to a node associated with the physical partition, and then running queries for that physical partition alone. This code may run either at an application server or a database server in various embodiments.

DETAILED DESCRIPTION

Figure 1:
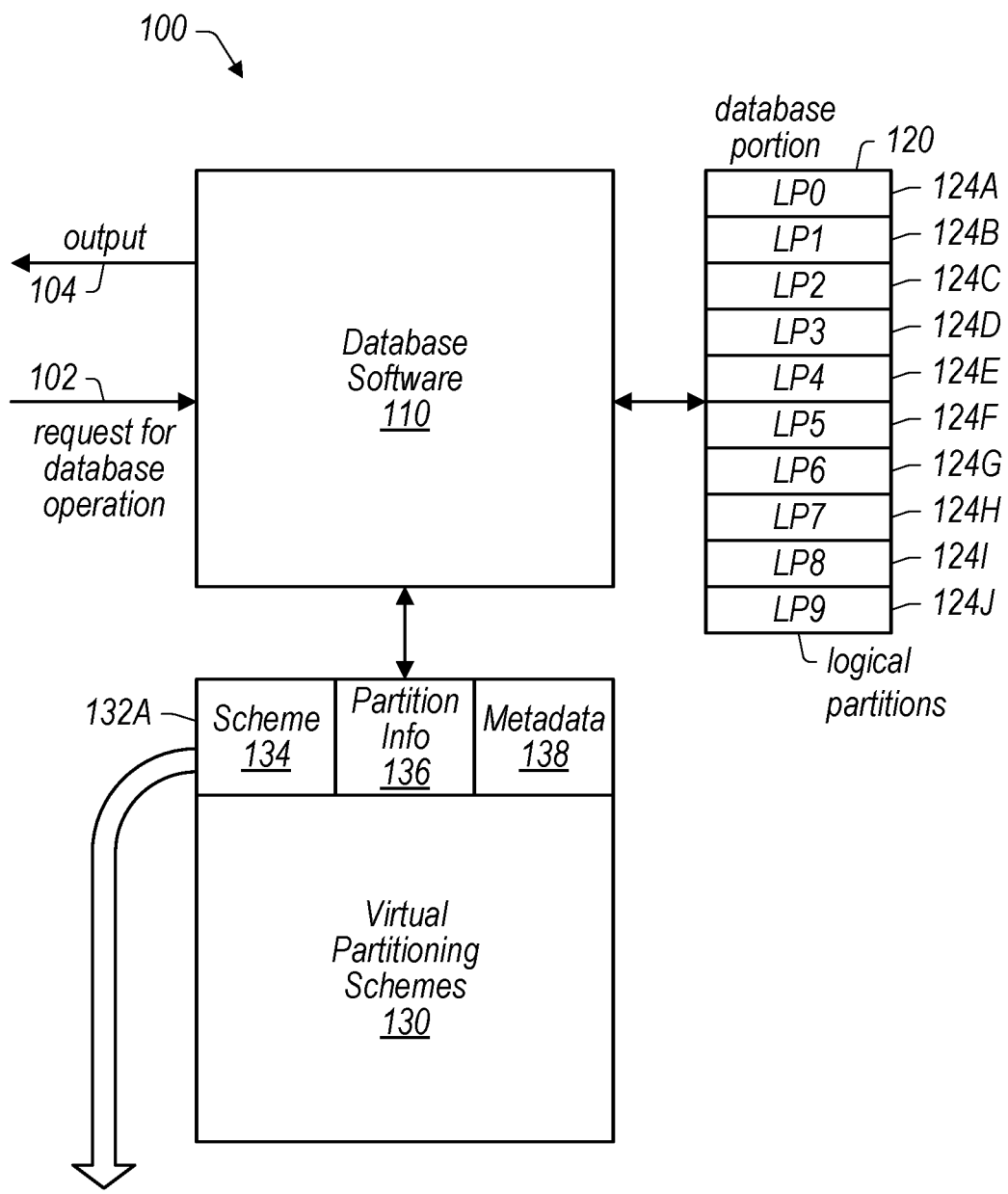
FIG. 1 is a block diagram of a database system that implements virtual partitioning.

In some database implementations, an "instance" of a database may store data for a multiplicity of tenants, without physical partitioning within that instance. SALESFORCE.COM, for example, may utilize such a paradigm. Without native physical partitioning of such a database instance, performing a database operation may entail querying a database table for all tenants, or orgs, for that instance in a single iteration. While such an implementation may work in some cases, it may not scale well, particularly when there are many tenants in a database instance. This architecture might lead to performance problems, and even query timeouts.

To solve the problem of achieving scalable performance in a database portion (e.g., an instance) that is not itself physically partitioned, the present disclosure introduces the concept of "virtual partitioning," in which the database application can handle a database operation by splitting a portion of a database into more granular parts ("virtual partitions") and performing the operation separately for these parts. Advantageously, this virtual partitioning can be dynamic, meaning that it can change over time. This paradigm allows, for example, dynamically partitioning a single SDB instance according to "node affinity" of different tenants. "Node affinity" refers to the fact that, in some configurations, certain nodes of a database cluster may have faster access to some data files as opposed to other nodes. Some nodes may thus have faster access to files of particular tenants than other nodes. Node affinity may change over time as the number of database nodes goes up or down.

As opposed to a paradigm in which there is one static physical partitioning scheme, the disclosed virtual partitioning paradigm is a way to achieve some of the benefits of physical partitioning, but without committing to a single, unchangeable partition scheme. In fact, virtual partitioning allows for any number of virtual partitioning schemes. A given virtual partitioning scheme can be used to divide tenants into any number of virtual partitions. Note that the framework for the virtual partitioning infrastructure does not, by itself, dictate how a particular database portion is going to be split. Instead, the infrastructure provides a framework for allowing various virtual partitioning schemes to created. It is these schemes that do specify how a database portion may be split.

Notably, multiple virtual partitioning schemes can be active at the same time, and they do not have to agree or align on how to divide the tenants. In this way, each tenant in the instance can "belong" to multiple different virtual partitions, depending on which scheme is currently used to find the tenant. Furthermore, virtual partitioning schemes can be created dynamically on the fly while the database application is running.

As the number of database tenants increases, additional database nodes may be used to service the aggregate load. This is referred to as "write scaling." As nodes are being added, tenants are being reassigned to the new nodes. Therefore, affinity of tenants to nodes will change. The virtual partitioning paradigm allows new schemes to be dynamically created to better align with the changing affinity. Note that some ongoing background processes may continue using previously created virtual partitioning schemes, and are allowed to run to completion. Meanwhile, new background processes may begin to use newly created virtual partitioning schemes to take advantage of the new affinity.

Turning now to FIG. 1, a block diagram of a database system implementing virtual partitioning is illustrated. As shown, computer system 100 includes database software 110, database portion 120, and storage for virtual partitioning schemes 130. SDB is one example of a possible implementation of database system 100.

Database software 110 is a generic representation of software that may exist on various components of computer system 100, including an application server or a database server. Briefly stated, an application server implements the logic of a particular application, while a database server implements functions relating to actually accessing the database. A database server may include database management software (DBMS) in some embodiments.

As shown, database software is executable to receive a request 102 to perform a database operation on database portion 120. Database portion 120 is a portion of storage for a database, where the database portion is not itself physically partitioned to any further degree. The database portion can thus be described as "not physically partitioned" even though the database portion may itself be a physical partition of a larger database that has multiple physical partitions in some cases. In other cases, the database portion has only a single physical partition (e.g., an "instance" of a database).

As previously mentioned, database portion 120 may be a SDB "instance" that can be considered to be a single physical partition. Alternatively, database portion 120 could be a single physical partition of a system such as an ORACLE database that has other physical partitions. Note that the term "database portion" is to be interpreted broadly to mean both a subset of a database (e.g., a single instance of a multi-instance database) and an entire database (e.g., where the database includes only a single instance).

In any event, database portion 120 stores data for multiple "logical partitions." Logical partitions are subsets of data that may be defined based on a "partition key." In a multi-tenant database context, the data for each tenant, or org, may be considered to be separate logical partition, where "org id" is used as the partition key. Accordingly, all items in such a logical partition have the same partition key value. "Virtual partitioning," as the term is used herein, is distinct from the concept of logical partitions in that a virtual partitioning scheme defines virtual partitions for a database portion, where each virtual partition in a virtual partitioning scheme includes one or more logical partitions.

As illustrated, database portion 120 includes logical partitions 124A-J, which can also be referred to as logical partitions 0-9. In one embodiment, each logical partition might correspond to data for a different tenant in a multi-tenant architecture. Virtual partitioning schemes 130 stores entries 132, each of which specifies a particular virtual partitioning scheme. As shown, in one embodiment, an entry 132 may include a scheme number 134, partition information 136, and scheme metadata 138.

Entry 132A shows one particular scheme ("scheme 1"), in which virtual partition 0 includes logical partitions 0-3 (124A-D), virtual partition 1 includes logical partitions 4-7 (124E-H), and virtual partition 2 includes logical partitions 8-9 (124I-J). Although not depicted, storage for schemes 130 may include entries for other virtual partitioning scheme. For example, a different virtual partitioning scheme might include two virtual partitions: one for logical partitions 0-4 (124A-E), and one for logical partitions 5-9 (124F-J). In short, a virtual partitioning scheme defines sub-groups of a group of logical partitions included in database portion 120. Virtual partitioning schemes 130 may be stored in a cache that stores a subset of virtual partitioning schemes used by database system 100 in some embodiments.

As will be described further, this virtual partitioning scheme paradigm is very flexible. Different database requests may thus employ different virtual partitioning schemes, with the result that different requests may concurrently use different virtual partitioning schemes. In some cases, request 102 may identify a specific, pre-existing virtual partitioning scheme. In other cases, request 102 may specify certain characteristics of a desired virtual partitioning scheme, and database software 110 may search schemes 130 for one that most closely matches the specified characteristics. Alternatively, a virtual partitioning scheme may be created on the fly in response to request 102.

After a virtual partitioning scheme is selected for request 102, the requested database operation can then be performed separately for the sub-groups of logical partitions defined by the virtual partitioning scheme. In one implementation, once a virtual partitioning scheme is selected for request 102, the requested database operation is performed in turn for the logical partitions in each virtual partition specified by the selected virtual partitioning scheme (e.g., the database operation is first performed for logical partitions in the first virtual partition in the selected scheme, followed by being performed for logical partitions in the second virtual partition in the scheme, etc.) By making the group of logical partitions in database portion 120 more granular, this allows database operations that need to operate, for example, on most or all logical partitions to be able to complete without timing out. As noted, this may be particularly important as the amount of data in database portion 120 scales.

Figure 2:
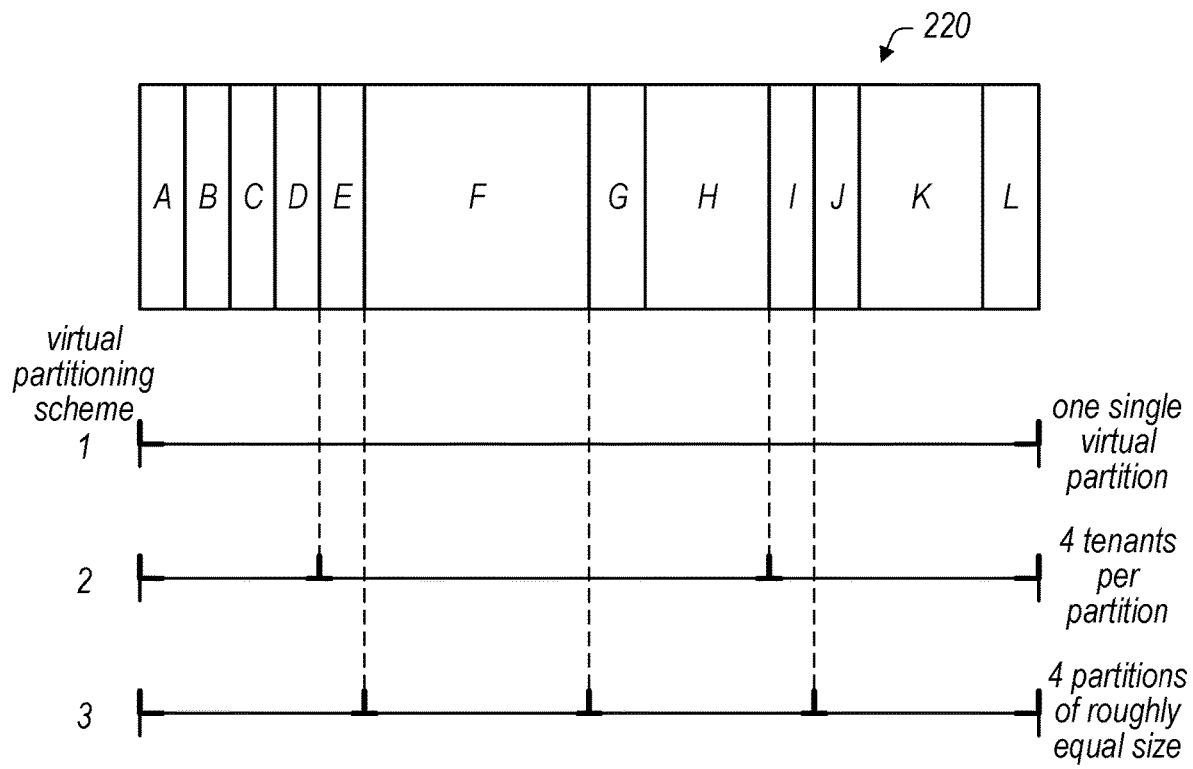
FIG. 2 is a block diagram illustrating different virtual partitionings of a database portion.

Turning now to FIG. 2, a block diagram of different possible virtual partitionings of a database portion 220 is shown. Database portion 220 corresponds to database portion 120 just described in FIG. 1. As shown, database portion 220 includes data for 12 tenants, denoted as A-L. In this embodiment, data for the 12 tenants is laid down linearly within database portion 220. Virtual partitioning scheme 230 corresponds to scheme 130 shown in FIG. 1. In this embodiment, each virtual partition is constrained to consist only of a contiguous range of tenants in 220. In other words, for any one virtual partition, a pair of lower and upper bound tenant ids is sufficient to determine the set of tenants in the virtual partition. Hence, the metadata for all the virtual partitions in a virtual partitioning scheme can be represented by just a set of break points.

Three possible virtual partitioning schemes are illustrated. In virtual partitioning scheme 1, there is a single partition that includes data for all tenants A-L. There are no additional break points other than the beginning and end of the data. Virtual partitioning scheme 2, on the other hand, includes 3 partitions, where each partition includes data for exactly 4 tenants, regardless of the data size per tenant. According, there are break points after tenants D and H for this scheme. Finally, virtual partitioning scheme 3 includes 4 partitions of roughly equal data size. Since the data sizes of the tenants are uneven, some partitions have more tenants then others. The break points are after tenant E, after tenant F, and after tenant I.

FIG. 2 thus illustrates that different virtual partitioning schemes may divide the logical partitions differently. For example, different virtual partitioning schemes may include different numbers of virtual partitions. Different virtual partitioning schemes can also have differing amounts of logical partitions per virtual partition, and have different data sizes. One possible virtual partition scheme may be created in response to a request to have virtual partitions with roughly the same number of logical partitions. Another virtual partition scheme may be created in response to a request to have virtual partitions with roughly the same amount of data per virtual partition. Different virtual partitioning schemes may be "active" at the same time. For example, at a given time, one background task might decide to use partitioning scheme 1 to work on all tenants at the same time, while another background task might decide to use partitioning scheme 2 to iterate over its 3 partitions using separate database transactions either sequentially or in parallel.

Figure 3:
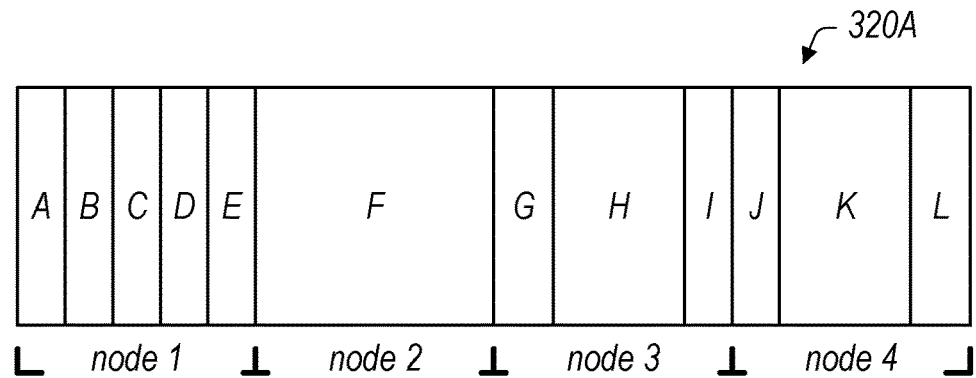
FIG. 3 is a block diagram illustrating different possible virtual partitionings of a database portion that can be performed in response to changing node affinities.
Figure 3:
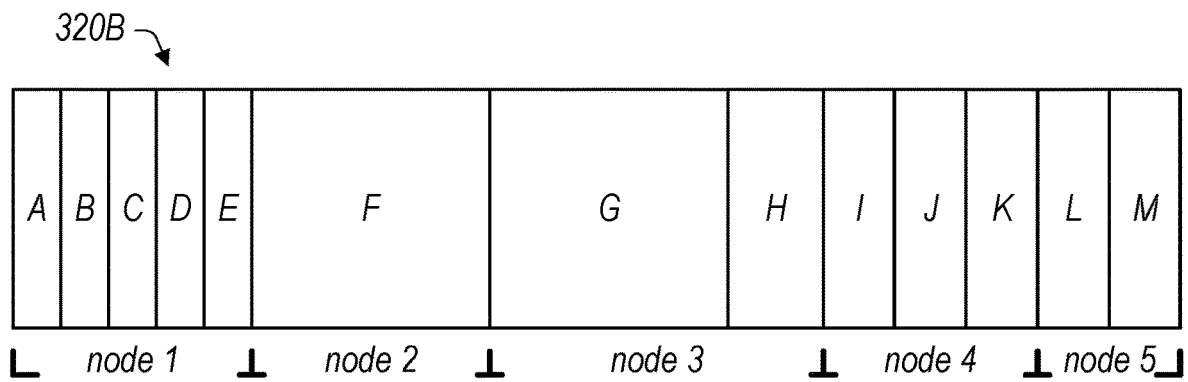

Turning now to FIG. 3, a block diagram illustrating the use of virtual partitioning in the context of changing node affinity is shown. FIG. 3 depicts database portions 320A and 320B, both of which correspond to database portion 120 shown in FIG. 1. Database portions 320A and 320B both represent the same database portion at different points in time. Database portion 320B corresponds to database portion 320A at a later point in time during which additional database writes have occurred, leading to more data being added to the database.

As shown, database portion 320A is implemented by four database nodes. A database "node" refers to the same physical storage, such that data on a node has common physical locality (and thus improved performance). The four database nodes making up database portion 320A may be located in physically distinct locations from one another (or at least separate enough that there is a performance hit for switching back and forth between nodes for a given tenant). For this reason, it may be desirable to locate all data for a particular logical partition/tenant on one node if possible.

In database portion 320A, node 1 stores data for tenants A-E, node 2 stores data for tenant F, node 3 stores data for tenants G-I, and node 4 stores data for tenants J-L. Accordingly, each tenant can be said to have "node affinity" relative to the node on which its data is stored. Virtual partitioning scheme 322A may thus be utilized to complement the tenants' node affinity. Under scheme 322A, four virtual partitions are established, one for each node. Note that scheme 322A may have been dynamically created in response to some indication of current node affinity.

The concept of changing node affinity is illustrated by database portion 320B, which shows a change in the size of data for various tenants. In particular, the size of the data for tenant G has greatly increased. Additionally, data for a new tenant, M, has also been added. Database portion 320B thus illustrates the effects of "write scaling," which may cause tenant node affinity to change. FIG. 3 shows that, in database portion 320B, node 1 now stores data for tenants A-E, node 2 stores data for tenant F, node 3 stores data for tenants G-H, node 4 stores data for tenants I-K, and node 5 (newly added to account for increased data size) stores data for tenants L-M.

In response to these new characteristics of data in database portion 320B, a new virtual partitioning scheme 322B may be created dynamically to adjust to the new node affinity. In this new scheme, virtual partitions 1 and 2 store data for the same clients as in scheme 322A. Virtual partitions 3 and 4 change tenants slightly, and virtual partition 5 is added. "Dynamic" creation of a virtual partitioning scheme in this context means that scheme 322B was not stored in preexisting fashion in the database systems, but rather was created on-the-fly in response to changing node affinity. Note that virtual partitioning scheme are not limited to one virtual partition per node; in various embodiments, a virtual partition may span nodes, and there may be more than one virtual partition for a given node. Consider the following possible virtual partition assignments: VP1 corresponds to tenants A-C; VP2 corresponds to tenants D-E; VP3 corresponds to tenant F; VP4 corresponds to G-H; VP5 corresponds to tenants I-K; and VP6 corresponds to tenants L-M. In this example, node 1 is split into virtual partitions 1 and 2, node 3 corresponds to virtual partition 3, etc.

Various systems that may implement virtual partitioning may be distributed in nature. For example, consider system 400 illustrated in FIG. 4. System 400 may have multiple application servers 410 in communication with a database server 420, which is in turn coupled to a database (not pictured). In such a configuration, multiple application servers may accept requests 402 from various sources. Requests 402 may, in various instances, either specify an existing virtual partition scheme or may specify characteristics of a desired virtual partition scheme.

Figure 4:
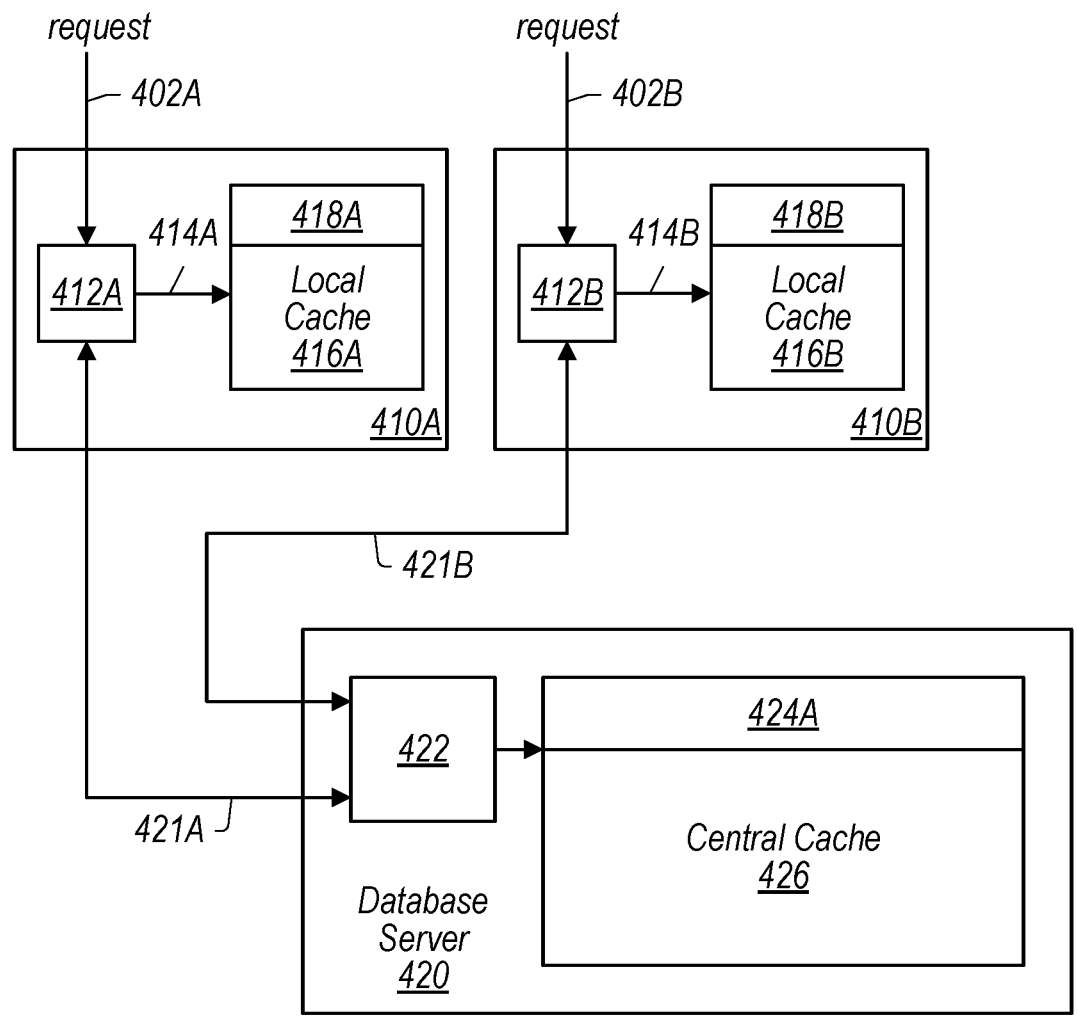
FIG. 4 is a block diagram illustrating caching of virtual partitioning schemes at both application and database servers.
Figure 4:
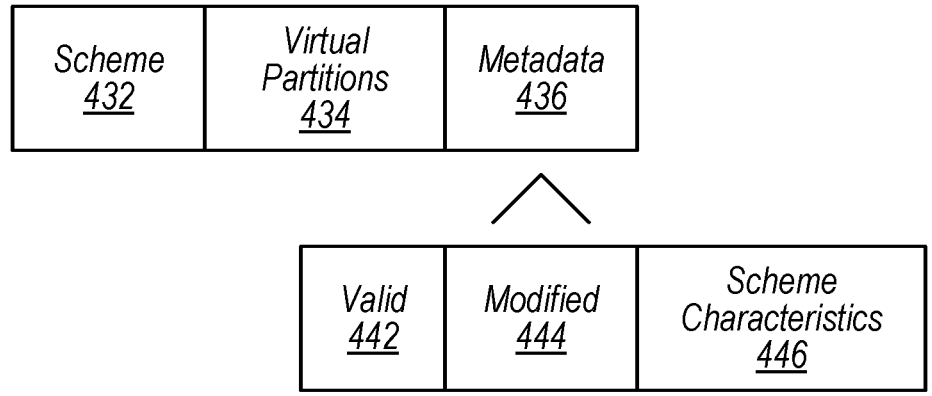

It therefore may be desirable in certain embodiments to include virtual partition caches 416 at each of one or more application servers. As shown in FIG. 4, application servers 410A and 410B may include respective local caches 416A and 416B. Representative entries in caches 416 are indicated by reference numerals 418A and 418B. Application servers 410A and 410B also include respective local cache logic modules 412A and 412B. Similarly, database server 420 includes central cache 426 and central cache logic module 422. A representative entry in cache 426 is denoted by reference numeral 424. Note that while central cache 426 is shown in this embodiment as being located at database server 420, in other embodiments, it can be located at another centralized location.

In one embodiment, entries 418/424 in caches 416 and 426 may be formatted to include fields such as those shown in FIG. 4. A field for scheme 432 can store an identifier (e.g., a number) for a virtual partitioning scheme—this may be specified for example in a request 402. A field for virtual partitions 434 may store indications of which tenants are assigned to each virtual partition. Alternatively, virtual partitions 434 may store logical partition boundaries for a given virtual partition. Thus, when logical partitions correspond to tenants in a multi-tenant system, a boundary in 434 might, for example, specify that a particular virtual partition includes all tenants within an upper and lower tenant ids.

Still further, entries 418/424 may include a field for storing entry metadata 436. Certain types of metadata 436, such as sub-fields for valid 442 and modified 444 data, are usable as described below to manage coherency between local caches 416 and 426. Conversely, metadata in scheme characteristics 446 sub-field may be usable to help identify a particular virtual partition scheme in various instances. For example, if request 402 specifies desired characteristics of a virtual partition scheme without a particular scheme identifier, scheme characteristics 446 might be interrogated to determine which if any schemes stored in caches 416 or 426 are appropriate for use. For example, scheme characteristics 446 might indicate a particular property that it attempts to optimize; alternatively, this sub-field might indicate a date of expiration or any other value that is suitable for helping manage cache entries.

Valid 442 field may be set to indicate a cache entry that is currently valid. This field may be set when the entry is written, and reset according to any applicable cache management scheme. The valid field may also be cleared if it is determined that the virtual partitioning scheme in the entry has been superseded—for example, if node affinity has changed. Similarly, modified 444 sub-field can be set for a particular entry in a local cache 416 if the corresponding application server creates a new virtual partitioning scheme that is not currently stored in central cache 426. Again, a newly created virtual partitioning scheme might be created for a variety of reasons, including a change in node affinity, or some other performance objective.

Local cache logic 412 includes software instructions that are operable to process requests 402, communicate with local caches 416 via interfaces 414, and communicate with central cache logic 422 via interfaces 421. If a request 402 specifies a particular virtual partitioning scheme stored in the corresponding local cache 416, local cache logic 412 will detect this hit and utilize the scheme accordingly. If cache 412 does not include the specified scheme, logic 412 can communicate with central cache logic 422 via interface 421 to retrieve the scheme. Local cache logic 412 can also periodically perform cache maintenance in some embodiments. For example, at some specified interval, local cache logic 412 may run a maintenance process that invalidates certain entries that are too old (metadata 436 in some embodiments may include a creation timestamp). Local cache logic 412 may also cause modified cache entries to be copied from a local cache 416 to central cache 426. In this manner, a new virtual partitioning scheme may be propagated from one local cache to another via the central cache. First, a new virtual partitioning scheme may be created on an application server, e.g., 410A. Entry 418A in cache 416A may be marked as both valid and modified. Then, local cache logic 412A can identify the modified entry and copy it to central cache 426. Central cache logic 422 may, in some embodiments, recognize the new virtual partitioning scheme it has just received, and cause superseded virtual partitioning schemes stored at local cache 416B to be invalidated. Subsequent requests for the latest virtual partitioning scheme at 416B local caches may cause the new virtual partitioning scheme to be retrieved from central cache 426. In sum, any known system 400 may utilize any known cache coherency protocol, as well as a cache hierarchy with any number of levels.

FIG. 4 illustrates how local and central caches may be employed to store virtual partitioning schemes. In the paradigm of FIG. 4, the local and central caches may store the same types of information in their respective entries. In some implementations, such, local and central caches may store slightly different types of information. For example, as shown next with respect to FIG. 5, local caches may store information indicating the number of virtual partitions in particular virtual partitioning schemes, while the central cache stores bound information that indicates what logical partitions are included in each virtual partition.

Figure 5:
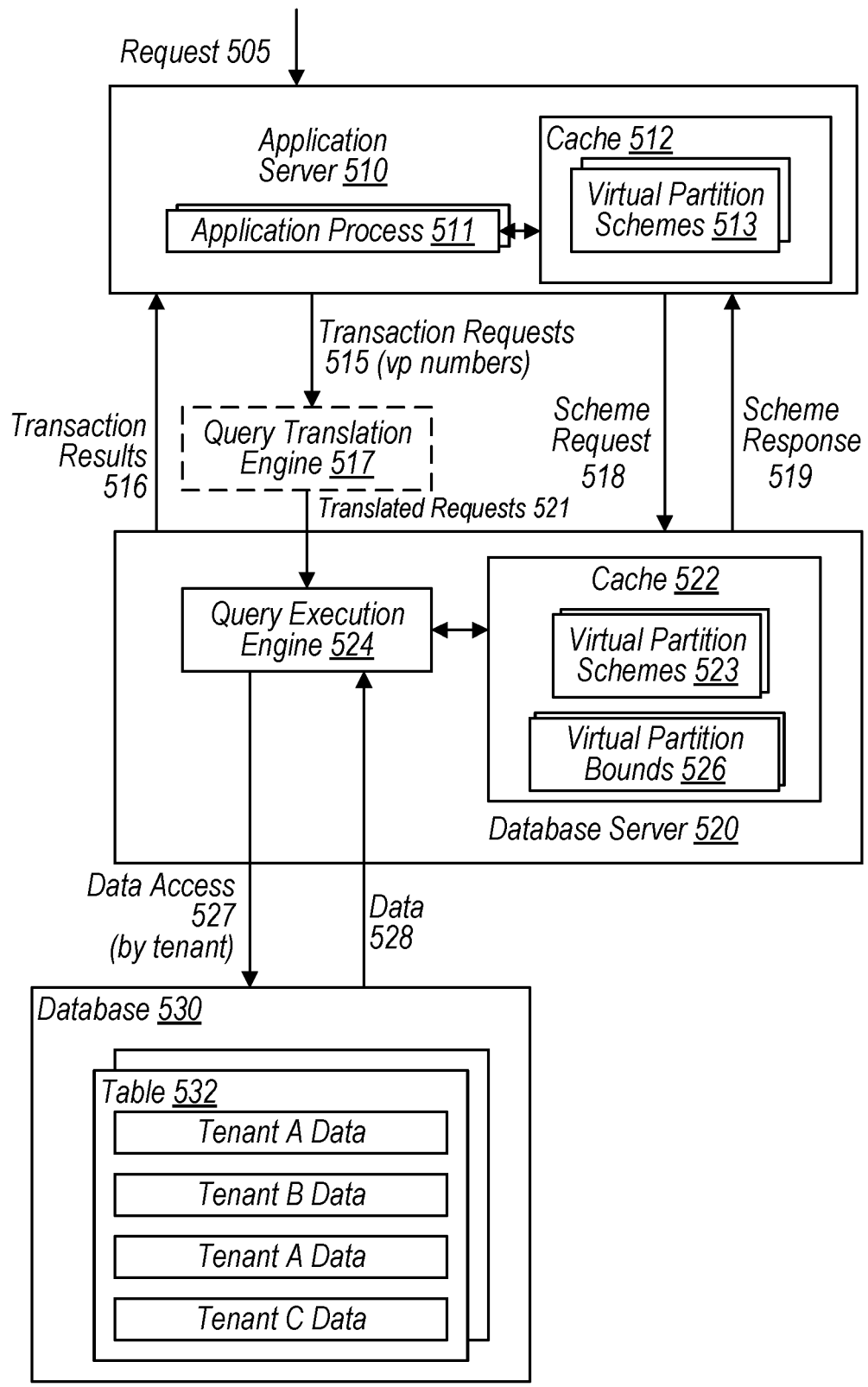
FIG. 5 is a block diagram of a database system for implementing virtual partitioning.

Turning now to FIG. 5, a block diagram is shown of a database system 500 that implements virtual partitioning schemes. System 500 includes an application server 510, a database server 520, and a database 530. Table 532 includes data from representative tenants A, B, and C.

In this context, consider an application process 511 running on server 510 that receives a request 505 that needs to access table 532. Application process may select one of virtual partitioning schemes 513 from cache 512, which may correspond to local cache 416 described in FIG. 4. If a desired partitioning scheme is not present in local cache 512, it may access scheme information 523 stored in central cache 522 via an interface that includes scheme request 518 and scheme response 519. Information stored in local cache 512 for the selected virtual partitioning scheme may specify a number of partitions for that scheme (recall that different virtual partitioning schemes may have differing numbers of virtual partitions). Accordingly, application process 511 may generate a number of transaction requests 515, each corresponding to one of the virtual partitions in the selected virtual partitioning scheme.

As shown, transaction requests 515 may be received at query translation engine 517. In some embodiments, request 505 (and thus transaction requests 515) are in a common format, regardless of the database implementation in which the underlying data is stored. Module 517 is shown with a dotted-line border to indicate that this module may be located inside or outside application server 510 in various embodiments. Query translation engine 517 permits database system 500 to include multiple different types of databases on the back-end (e.g., SDB, ORACLE), while permitting a single front-end interface. Accordingly, in some embodiments, request 505 (and thus transaction requests 515) are in a common format, regardless of the database implementation in which the underlying data is stored. Query translation engine 517, in turn, translates transaction requests 515 into translated requests 521, which are in appropriate database-specific formats. In some cases, query translation engine 517 may be invoked at compilation time, while in others, engine 517 may be invoked by application server 510 to support dynamically generated requests.

Query execution engine 524 in turn receives translated requests 521, each of which specifies a virtual partition within one of virtual partition schemes 523. Engine 524 can then look up, in virtual partition bounds 526, the bound information for the specified virtual partition. Virtual partitions bounds 526 includes, for each virtual partition in each scheme, a range of tenant ids that correspond to that virtual partition. Once that information is retrieved, engine 524 sends data accesses 527 to database 530 that are specified by tenant ids. Engine 524 may iterate over the range of permissible tenants to generate multiple accesses 527 in some embodiments. Accordingly, only those portions of table 532 that correspond to tenants specified by a particular access 527 are retrieved. The results of these queries are returned as data 528 and transaction results 516.

Example Implementation of Virtual Partitioning

Figure 9:
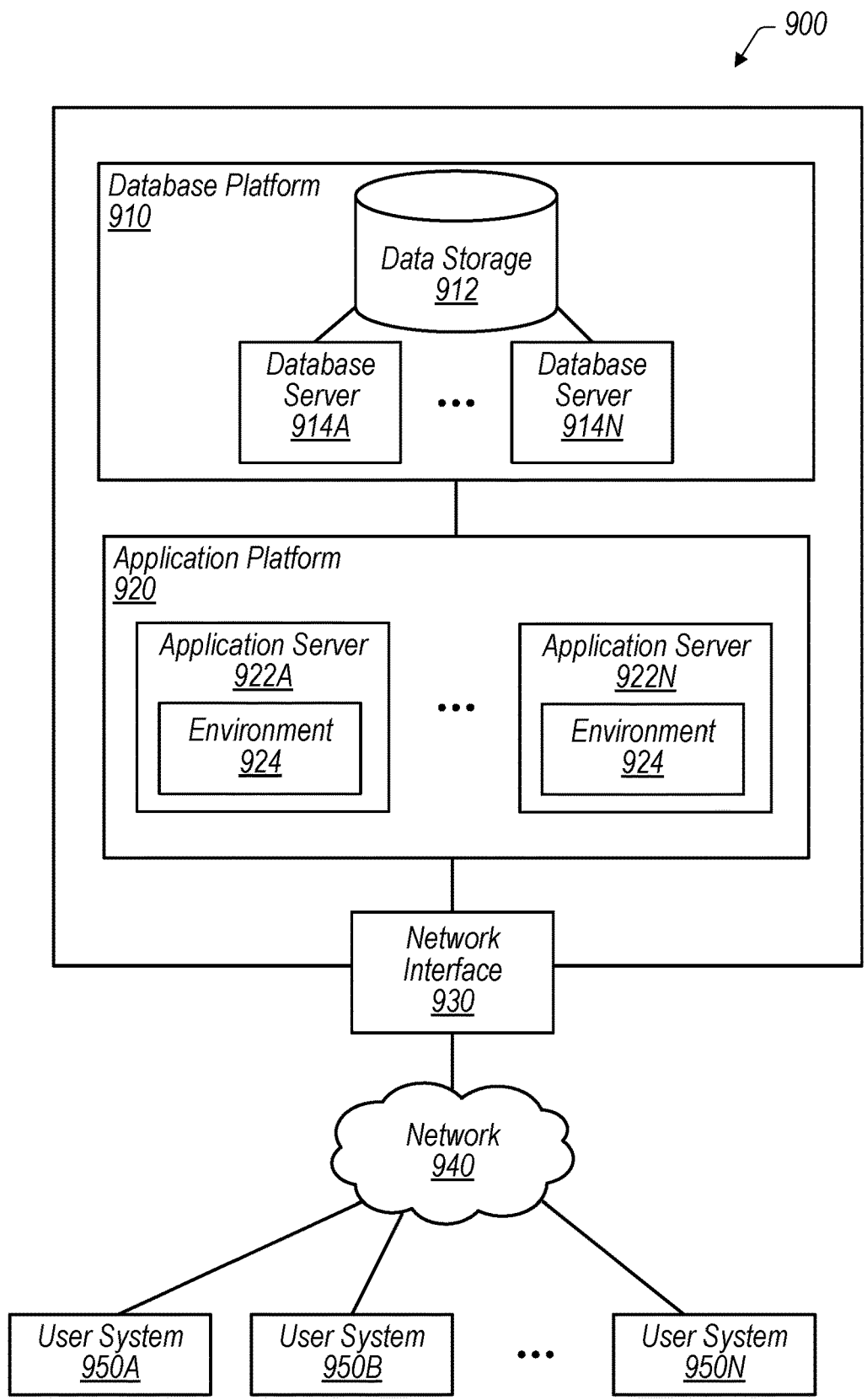
FIG. 9 is a block diagram of a multi-tenant database system that may employ virtual partitioning schemes.

One potential environment in which the disclosed virtual partitioning paradigm may be implemented is a multi-tenant database system such as that operated by SALESFORCE. COM. (FIG. 9 provides further discussion of a multi-tenant database system.) Some systems may support multiple types of databases (SALESFORCE, ORACLE, etc.) that are addressed with different types of parameters, including differing numbers of physical partitions.

One type of query language for interacting with multiple types of databases is the SALESFORCE STRUCTURED QUERY LANGUAGE, or SF SQL. SF SQL is referenced, for example, in U.S. Patent Publication No. 2018/0218044, entitled "Systems, Methods, and Apparatuses for Implementing a By Partition Command Term Within a Multi-Tenant Aware Structured Query Language." This type of query language can be modified to accommodate the disclosed virtual partitioning paradigm. In one embodiment, in order to enable queries to be executed against logical partitions that correspond to a particular virtual partition, an infrastructure may be used that supports query statements having a "BY PARTITION" clause. The BY PARTITION clause may specify a partition number, a portion of which identifies a virtual partition scheme and a portion of which identifies a virtual partition within that scheme. When a query engine receives a query statement that includes a BY PARTITION clause, the query engine (e.g., query execution engine 524) may create a query plan in which in which the database system initially queries a tenant table to identify tenants for the virtual partition associated with the BY PARTITION clause. Thereafter, the remaining portion of the query statement (that is, the aspects of the query apart from the BY PARTITION clause) may be executed against the data of each identified tenant.

In some implementations, the virtual partitioning paradigm may be implemented by modifications to the manner in which the BY PARTITION clause is coded. The translator utilized by SF SQL may be modified to cause the BY PARTITION statement to visit a subset of all tenants based on a partition number parameter. This change may be made at the database server in various embodiments.

Application-Level Interfaces

In addition to providing support for virtual partitioning at the database server, certain interfaces or resources may also be made available at the application server. These resources may be made available to database tasks or operations that may be programmed in high-level languages such as JAVA.

One such interface at the application server may allow a task to retrieve the current partitioning scheme, and may be called DBContext.getPartitioningScheme( ) in one embodiment. Note that two consecutive calls to DBContext.getPartitioningScheme( ) whether from the same or different threads, may not necessarily return the same partitioning scheme, since the scheme can change at any time.

Additionally, a method such as getAllPartitions( ) may return a list of all partitions in the partitioning scheme, which may be called SfdcPartitions in one embodiment. This list can cover all tenants associated with the database instance. Accordingly, to perform some work on every partition, two overloaded methods forEachPartition( ) are often used to invoke a lambda function on each partition, while managing the database connections.

In some cases, a background process may be interrupted while iterating over the partitions of a particular partitioning scheme. In this scenario, the process can save the current partition number in the database and resume later as long as it uses DBContext.getPartitioningSchemeByPartitionNumber( ) to reconstruct the same partitioning scheme, and then continue from the partition where it left off Another interface may be used to represent a virtual partition inside some virtual partitioning scheme. For example, the method getPartitionNumber( ) may return an integer representing the partition. In some implementations, this method may return a 32-bit number, in which the upper 16-bit of the partition number represents the virtual partitioning scheme itself, and the lower 16-bit represents the partition within the partitioning scheme. It is also possible to pass an array of partition numbers (whether belonging to the same node, or not) to a procedure (e.g., in PL/SQL) that iterates over them.

Some changes may need to be made to certain functionalities associated with the programming language used by the task. For example, a JAVA caller may need to be changed so that a separate procedure is called for each partition. Looping of partitions inside certain procedures may need to be rewritten.

Example Virtual Partitioning Schemes

As has been discussed, any number of virtual partitioning schemes are possible in various implementations. For example, one scheme might include a single partition that contains every tenant in a database instance (e.g., virtual partitioning scheme 1 described in FIG. 2). A second possible scheme is one in which there are a fixed number (e.g., 62) of partitions, and in which tenants are statically assigned to one of these partitions based on some criteria, such as the last character of an identifier for the tenant (e.g., its orgid).

Other possible partitioning schemes may be described as range-based partitioning. Here, the set of all tenants are separated into one or more ranges of orgids, using a set of boundary points (e.g., virtual partition bounds 526). In other words, whether a tenant falls in a particular partition is determined by whether the orgid value falls between the lower and upper bounds of the partition. Sets of boundary points may be computed and recomputed in some embodiments using queries similar to pk-chunking. See https://developer.salesforce.com/blogs/engineering/2015/03/use-pk-chunking-extract-large-data-sets-salesforce.html.

Multiple range-based partitioning schemes can be active at any time, each represented by a different set of boundary points. Each call to DBContext.getPartitioningScheme( ) may return a different scheme. This implementation allows partitioning schemes to be virtual and dynamic.

Inside the SDB database, for example, the partitioning schemes and their sets of boundary points may be persisted in tables sfdc_util.partitioning_schemes and sfdc_util.partition_breaks. Once stored in SDB, a partitioning scheme can be reused by processes on different threads or different application servers, for example using caches such as those shown in FIG. 4. A partitioning scheme can be kept active for a configurable amount of time, such as until a newer partitioning scheme is created or until existing usages of a given scheme are completed.

When a partitioning scheme is created, a query may be run to scan all tenants and determine a set of boundary points according to a size_target parameter. Two examples of the size target parameter are RangeByCount and RangeBySize; each may be followed by a numerical parameter. The number is the total number of desired partitions in the partitioning scheme. RangeByCount means the boundary points are selected such that the number of tenants in each partition is roughly the same—see virtual partitioning scheme 2 in FIG. 2. RangeBySize means the total data size of the tenants in each partition as returned by pg_tenant_size( ) is roughly the same—see virtual partitioning scheme 3 in FIG. 2. For example, RangeByCount5 gives 5 partitions with roughly the same number of tenants (=⅕ of total number of tenants) in each partition. This may make it suitable for some small- to medium-sized database instances. In JAVA, a Manager class may be used to manage the lifecycle of partitioning schemes. As discussed, this class may maintain a local cache of partitioning schemes on the application server that it has seen. When the method getLatestPartitioningSchemeInfo( ) of the Manager class is called, it looks for an existing partitioning scheme with the given size target within the last REUSE_NUM_MINUTES (default 60) minutes. If found, it is reused. If not, the method queries the database (e.g., cache 426) to see if another thread or another application server has created a suitable partitioning scheme, which it reuses and caches. If nothing suitable is found, the method may cause deletion of any virtual partitioning schemes that are over STALE_NUM_DAYS (default 60) days old. This self-cleaning step eliminates the need to run a background job to clean up stale unused partitioning schemes. Then the method runs a query to determine the boundary points according to the given size_target. Then the method calls sfdc_util.save_partitioning_scheme( ) to persist the new partitioning scheme. Once it is saved, the new partitioning scheme is cached in the Manager class and it is available for reuse by other threads. If multiple threads are calling the getLatestPartitioningSchemeInfo( ) method of the Manager class at the same time, there is synchronization at the JAVA level to ensure only one thread can be creating a new partitioning scheme at any time. If multiple appservers are calling sfdc_util.save_partitioning_scheme( ) at the same time, there is database-level synchronization gated by insertion into table sfdc_util.partitioning_schemes with the same primary key. The JAVA side may round the created_date to the nearest 5 minutes, so that sfdc_util.partitioning_schemes would not create duplicate partitioning schemes within that time duration. These precautions taken together help prevent the case in which duplicate new partitioning schemes are created at the same time, such as during startup.

Translation of SF SQL BY PARTITION Statements

SF SQL statements may be translated into generic SQL by a database translator in some embodiments (e.g., query translation engine 524). When an SFSQL-prefixed statement uses a BY PARTITION clause, on the database application side, the translated SQL may use multiple techniques to confine the query to the data in the specified virtual partition. For example, when all tables are partitioned in the SF SQL statement, the translated SDB-native SQL statement may lead with a nested select that scans a tenant table between lower and upper bounds given by sfdc_util.get_partition_bounds( ) calls. That result is then laterally joined to another nested query that contains the original query, but where every table is also laterally joined to the first nested select. The resulting query plan is that the database would scan the tenant table between the lower and bounds and for each tenant found, and it will execute the original query for that tenant. In more complicated cases, for example when aggregate functions are involved, the translated SDB-native queries will be correspondingly more complicated.

Accordingly, with virtual partitioning, the code may be statically written. An SF SQL statement may be statically written using the BY PARTITION clause, and statically translated. But the translated SQL has a dynamic element because it can filter the tenants according to a dynamic condition. With this dynamic condition, the assignment of tenants to partitions becomes dynamic. At any moment, any part of the database application can view the same database as if it contains a different number of partitions with different tenant assignments, as compared with any other parts of the same database application. Hence, a simple fast background job can pick a partitioning scheme with few large partitions, and work on coarse chunks of work. A resource-intensive background job, on the other hand, may instead pick a partitioning scheme with lots of small partitions, so that it has finer granularity. This level of flexibility is something that a static partitioning scheme cannot provide.

Method Figures

Figure 6:
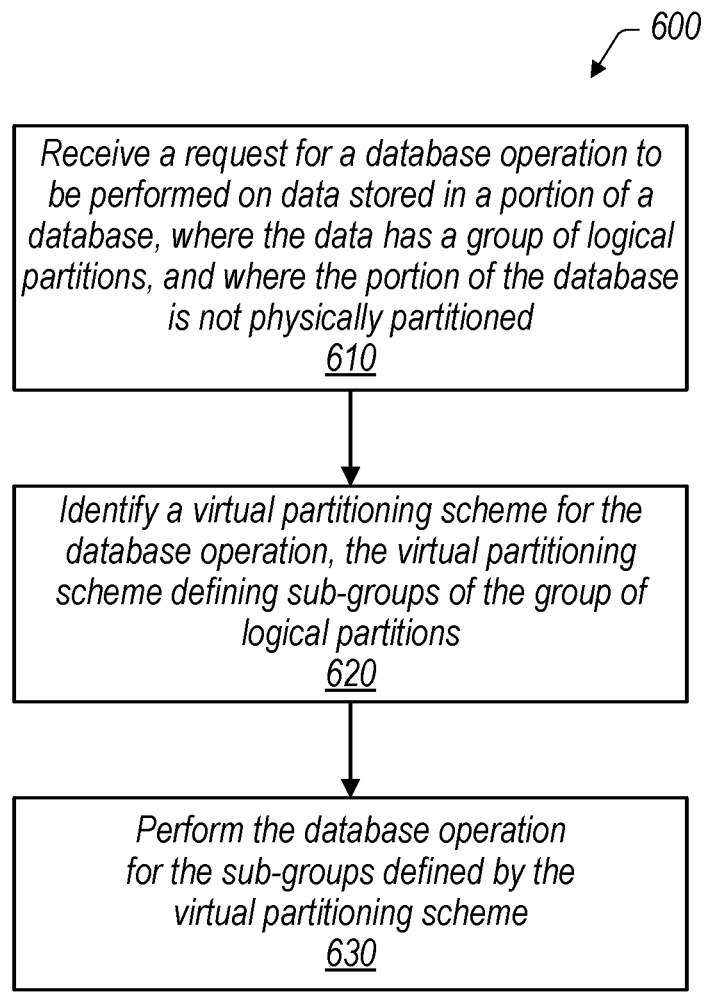
FIG. 6 is a flowchart of one embodiment of a method for utilizing virtual partitions with a database.
Figure 7:
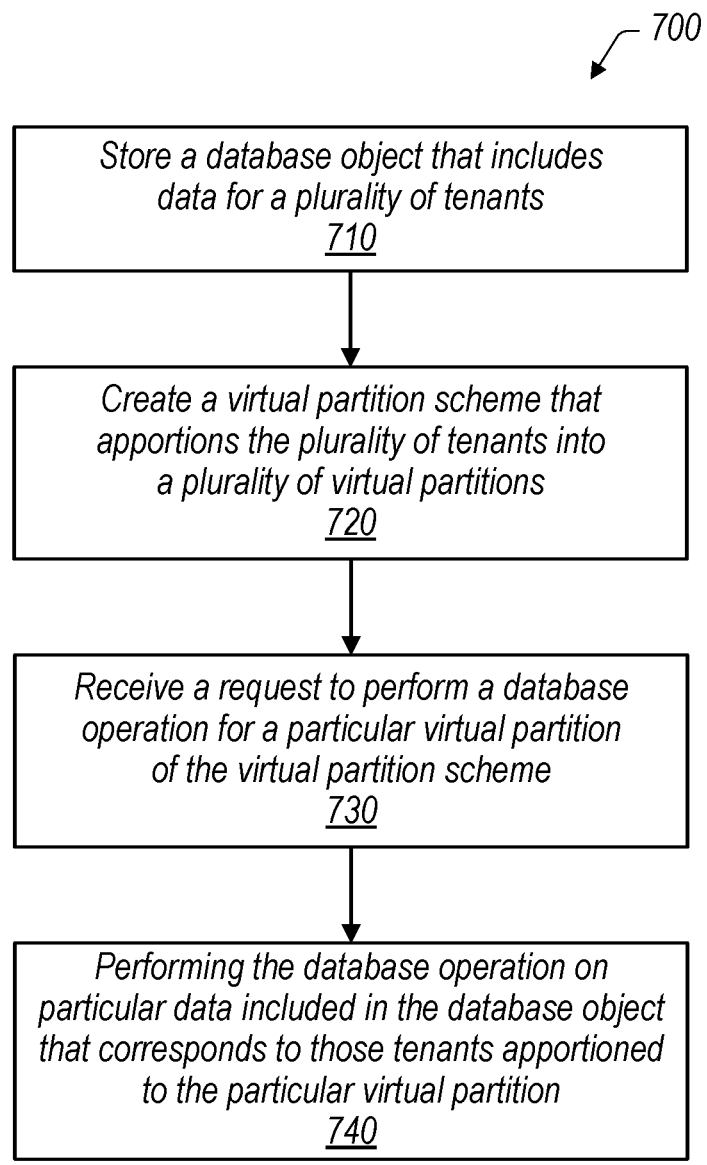
FIG. 7 is a flowchart of another embodiment of a method for utilizing virtual partitions with a database.
Figure 8:
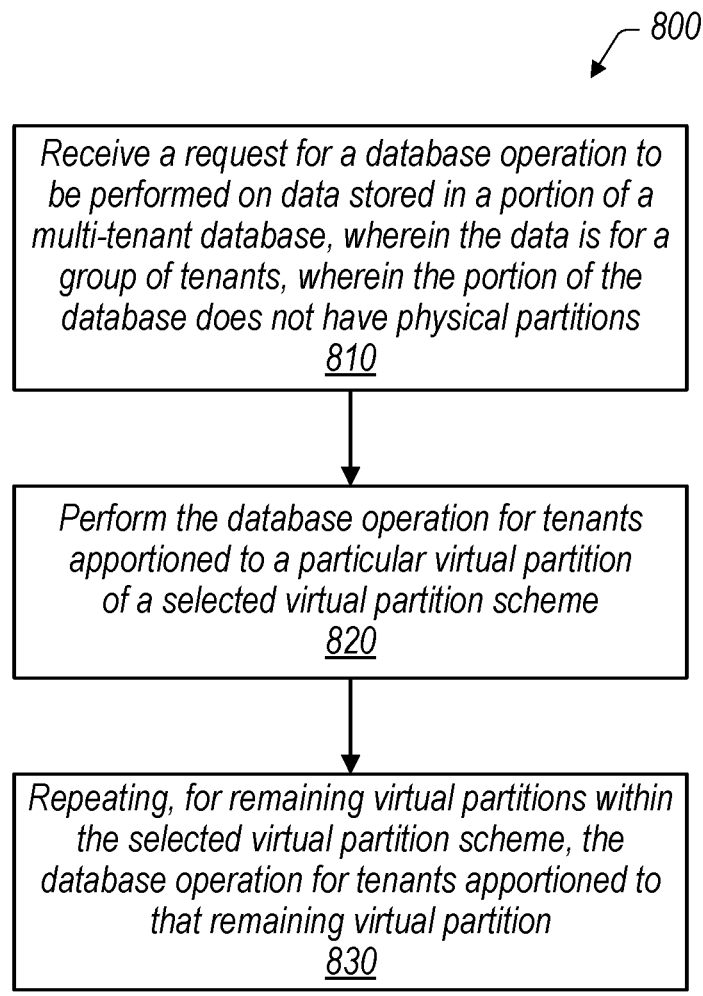
FIG. 8 is a flowchart of yet another embodiment of a method for utilizing virtual partitions with a database.

FIGS. 6-8 describe exemplary formulations of disclosed concepts in the context of method flowcharts.

Turning now to FIG. 6, a flowchart of one embodiment of a method for utilizing virtual partitions within a database is illustrated. Method 600 may be performed by a computer system that implements a database system. In some embodiments, method 600 may be performed by a combination of an application server and a database server as illustrated in FIG. 5.

Method 600 begins at 610, in which the computer system receives a request for a database operation to be performed on data stored in a portion of a database. The database portion is not itself physically partitioned. In one embodiment, the database portion is an instance of a database such a SALESFORCE DB instance that has multiple logical partitions of data. In other embodiments, the database may have multiple physical partitions, and the database portion is a contained that corresponds to one of these partitions. The data in the database portion may be divided according to a group of logical partitions. For example, if the database is a multi-tenant database, the database portion may have a group of logical partitions, and different groups of logical partitions may correspond to data of a different tenant.

In 620, the method continues with the computer system identifying a virtual partitioning scheme for the database operation, where the virtual partitioning scheme defines sub-groups of the group of logical partitions. For example, if the database portion stores data for logical partitions denoted as 1-10, one possible virtual partitioning scheme might have three virtual partitions: VP 1 (logical partitions 1-3); VP 2 (logical partitions 4-6); and VP 3 (logical partitions 7-10). Because of the flexibility afforded by the use of virtual partitions, a virtual partitioning scheme may vary from one database access to the next. Similarly, virtual partitioning schemes may be created on the fly. Accordingly, the computer system may simultaneously store indications of multiple possible virtual partitioning schemes, meaning that multiple schemes may be "active" (in use or available for use) at the same time. These different virtual partitioning schemes may thus include first and second schemes that divide the group of logical partitions in different ways. Furthermore, first and second schemes may include different numbers of virtual partitions.

Various virtual partitioning schemes may be "range-based" partitioning schemes that involve setting boundary points for the group of logical partitions. For example, a "RangeByCount" partitioning scheme may be created by setting boundary points for the group of logical partitions to attempt to divide (e.g., as near as possible) the group of logical partitions equally between a specified number of virtual partitions (see the example in the preceding paragraph). Alternatively, a "RangeBySize" partitioning scheme may be created by setting boundary points for the group of logical partitions to attempt to distribute amounts of data in the portion of the database equally between the desired number of virtual partitions. In such an embodiment, each virtual partition may store approximately the same amount of data (to the extent possible).

In some embodiments, 620 may further include the use of one or more caches. For example, the identifying may include retrieving, from a local cache on an application server that receives the request, a number of virtual partitions specified in the identified virtual partitioning scheme. The identifying may further include retrieving, from a central cache on a database server for the database, bound information for various ones of the number of virtual partitions, where the bound information for a given virtual partition is usable to identify a particular sub-group of logical partitions for the given virtual partition.

In 630, method 600 concludes with the computer system performing the database operation for the sub-groups defined by the virtual partitioning scheme. In some cases, the database operation may be a background job that needs to operate on all logical partitions in the database portion. But if the amount of data for all logical partitions is too great, a single operation of all these logical partitions may undesirably time out. By using a virtual partitioning scheme, however, the database operation may be able to performed for each sub-group of logical partitions in turn (or concurrently), thus preventing a timeout. Note that in some embodiments, a first database operation may be performed using a first virtual partitioning scheme while concurrently performing a second database operation using a second virtual partitioning scheme. In some cases, a new virtual partitioning scheme may be created while the database operation is being performed to order to best suit particular properties of the operation.

In addition to method 600, a computer system configured to perform operations of method 600, as well as a non-transitory, computer-readable storage medium having program instructions stored thereon that are capable of causing a database system to perform operations of method 600, are also contemplated.

Turning now to FIG. 7, a flowchart of another embodiment of a method for utilizing virtual partitions with a database is illustrated. Method 700, which has similarities to method 600, may be performed by a database system. In some embodiments, method 700 may be performed by a combination of an application server and a database server as illustrated in FIG. 5.

Method 700 begins at 710, in which the database system stores a database object that includes data for a plurality of tenants. The data for each tenant may constitute data for a logical partition as described above for method 600. This database object may be stored in a portion of a database that is not physically partitioned in some embodiments, as described above.

Method 700 continues at 720, in which the database system creates a virtual partition scheme that apportions the plurality of tenants into a plurality of virtual partitions. The virtual partition scheme that is created may be explicitly specified by an end user or may be created to meet some specified criteria. As noted, in some cases, tenants may be apportioned to virtual partitions in order to equalize tenants or data size between the virtual partitions.

In 730, the database system receives a request to perform a database operation for a particular virtual partition of the virtual partition scheme. In some cases, the request identifies the virtual partition scheme from a set of virtual partition schemes. The request may also further identify the particular virtual partition within the virtual partition scheme. Currently active virtual partitioning schemes may be cached by the database system in some embodiments. In some cases, the particular virtual partition scheme specifies bound values that correspond to tenant ids.

Finally, in 740, method 700 concludes with the database system performing the database operation on particular data included in the database object that corresponds to those tenants apportioned to the particular virtual partition. In some implementations, these tenants may be identified by bound values for the particular virtual partition.

Performing the database operation for these tenants may include, for each tenant apportioned to the particular virtual partition, executing a specified query against data of that tenant. Once the database operation is performed for each tenant in the particular virtual partition, method 700 may further include, for each remaining virtual partition in the virtual partition scheme, performing the database operation on data included in the database object that corresponds to those tenants apportioned to that remaining virtual partition.

In some embodiments, the database object is stored on a plurality of database nodes. Node affinity for these nodes may change over time. In such embodiments, the operations may further comprise, in response to a change in node affinity of the plurality of tenants relative to the plurality of database nodes, creating and using a new virtual partition scheme. A change in node affinity may be based, for example, on the addition of one or more new tenants to the plurality of tenants. Node affinity might also change based on a significant change in the size of a particular tenant. In some implementations, tenants may be migrated between nodes to redistribute load. This means that tenant affinity to nodes may change after a migration, even when there are no new tenants or significant change of the size of individual tenants.

In addition to method 700, a computer system configured to perform operations of method 700, as well as a non-transitory, computer-readable storage medium having program instructions stored thereon that are capable of causing a database system to perform operations of method 700, are also contemplated. Ancillary features described with reference to method 600 are also applicable to method 700 unless otherwise noted, and vice versa.

Turning now to FIG. 8, a flowchart of one embodiment of yet another method for utilizing virtual partitions within a database is illustrated. Method 800 may be performed by a computer system that implements a database system. In some embodiments, method 800 may be performed by a combination of an application server and a database server as illustrated in FIG. 5.

Method 800 begins at 810, in which a computer system receives a request for a database operation to be performed on data stored in a portion of a multi-tenant database, where the data in the database portion is for a group of tenants, and wherein the database portion of the database is not itself further physically partitioned.

Method 800 continues at 820, in which the computer system performs the database operation for tenants apportioned to a particular virtual partition of a selected virtual partition scheme.

Finally, method 800 concludes at 830, in which the computer system repeats, for remaining virtual partitions within the selected virtual partition scheme, the database operation for tenants apportioned to that remaining virtual partition.

In some embodiments, method 800 may be supplemented by the use of a cache for storing virtual partitioning scheme information. The cache may be stored at the application server, for example (and thus called a "local cache"). In some embodiments, the request may specify virtual partitioning criteria. This virtual partition criteria may be used to search a cache to choose one of a set of virtual partitioning schemes stored by the cache, according to which scheme best matches the virtual partitioning criteria. In some case, the local cache may not store a virtual partitioning scheme that meets the virtual partitioning criteria in the request. In such a case, the search may be expanded to a central cache of virtual partitioning schemes that is stored on a database server. In some embodiments, the local and central caches store the same information. In other embodiments, the local cache stores an indication of a number of virtual partitions for a given virtual partitioning scheme, and the central cache stores bound information indicating ranges of tenants included within each virtual partition in the given virtual partitioning scheme.

The cache may be updated over time. For example, after completing the search, a cache management process might operate to delete a set of older virtual partitioning schemes from the cache. This cache management process might instead operate on a periodic schedule. If an entry needs to be replaced in the cache, any known algorithm such as a least recently used (LRU) may be employed. Entry within the cache may also be updated over time. For example, in response to adding data for a new tenant of a multi-tenant database, a cache management process may need to redraw partition bounds of at least one virtual partition specified by the selected virtual partitioning scheme in order to accommodate the new tenant, or to account for a change in node affinity caused by write scaling.

In addition to method 800, a computer system configured to perform operations of method 800, as well as a non-transitory, computer-readable storage medium having program instructions stored thereon that are capable of causing a database system to perform operations of method 800, are also contemplated. Features relating to a cache for storing virtual partitioning scheme information are also applicable to methods 600 and 700. Features described in reference to methods 600 and 700 are in turn applicable to method 800.

As previously noted, one possible application of the disclosed virtual partitioning techniques is to a multi-tenant database system. General details of such a system are provided with respect to FIG. 9.

Exemplary Multi-Tenant Database System

Turning now to FIG. 9, an exemplary multi-tenant database system (MTS) 900 in which various techniques of the present disclosure can be implemented is shown. In FIG. 9, MTS 900 includes a database platform 910, an application platform 920, and a network interface 930 connected to a network 940. Also as shown, database platform 910 includes a data storage 912 and a set of database servers 914A-N that interact with data storage 912, and application platform 920 includes a set of application servers 922A-N having respective environments 924. In the illustrated embodiment, MTS 900 is connected to various user systems 950A-N through network 940. The disclosed multi-tenant system is included for illustrative purposes and is not intended to limit the scope of the present disclosure. In other embodiments, techniques of this disclosure are implemented in non-multi-tenant environments such as client/server environments, cloud computing environments, clustered computers, etc.

MTS 900, in various embodiments, is a set of computer systems that together provide various services to users (alternatively referred to as "tenants") that interact with MTS 900. In some embodiments, MTS 900 implements a customer relationship management (CRM) system that provides mechanism for tenants (e.g., companies, government bodies, etc.) to manage their relationships and interactions with customers and potential customers. For example, MTS 900 might enable tenants to store customer contact information (e.g., a customer's website, email address, telephone number, and social media data), identify sales opportunities, record service issues, and manage marketing campaigns. Furthermore, MTS 900 may enable those tenants to identify how customers have been communicated with, what the customers have bought, when the customers last purchased items, and what the customers paid. To provide the services of a CRM system and/or other services, as shown, MTS 900 includes a database platform 910 and an application platform 920.

Database platform 910, in various embodiments, is a combination of hardware elements and software routines that implement database services for storing and managing data of MTS 900, including tenant data. As shown, database platform 910 includes data storage 912. Data storage 912, in various embodiments, includes a set of storage devices (e.g., solid state drives, hard disk drives, etc.) that are connected together on a network (e.g., a storage attached network (SAN)) and configured to redundantly store data to prevent data loss. In various embodiments, data storage 912 is used to implement a database (e.g., database 110) comprising a collection of information that is organized in a way that allows for access, storage, and manipulation of the information. Data storage 912 may implement a single database, a distributed database, a collection of distributed databases, a database with redundant online or offline backups or other redundancies, etc. As part of implementing the database, data storage 912 may store files (e.g., files 130) that include one or more database records having respective data payloads (e.g., values for fields of a database table) and metadata (e.g., a key value, timestamp, table identifier of the table associated with the record, tenant identifier of the tenant associated with the record, etc.).

In various embodiments, a database record may correspond to a row of a table. A table generally contains one or more data categories that are logically arranged as columns or fields in a viewable schema. Accordingly, each record of a table may contain an instance of data for each category defined by the fields. For example, a database may include a table that describes a customer with fields for basic contact information such as name, address, phone number, fax number, etc. A record therefore for that table may include a value for each of the fields (e.g., a name for the name field) in the table. Another table might describe a purchase order, including fields for information such as customer, product, sale price, date, etc. In various embodiments, standard entity tables are provided for use by all tenants, such as tables for account, contact, lead and opportunity data, each containing pre-defined fields. MTS 900 may store, in the same table, database records for one or more tenants—that is, tenants may share a table. Accordingly, database records, in various embodiments, include a tenant identifier that indicates the owner of a database record. As a result, the data of one tenant is kept secure and separate from that of other tenants so that one tenant does not have access to another tenant's data, unless such data is expressly shared.

Database servers 914, in various embodiments, are hardware elements, software routines, or a combination thereof capable of providing database services, such as data storage, data retrieval, and/or data manipulation. A database server 914 may correspond to database node 150. Such database services may be provided by database servers 914 to components (e.g., application servers 922) within MTS 900 and to components external to MTS 900. As an example, a database server 914 may receive a database transaction request from an application server 922 that is requesting data to be written to or read from data storage 912. The database transaction request may specify an SQL SELECT command to select one or more rows from one or more database tables. The contents of a row may be defined in a database record and thus database server 914 may locate and return one or more database records that correspond to the selected one or more table rows. In various cases, the database transaction request may instruct database server 914 to write one or more database records for the LSM tree—database servers 914 maintain the LSM tree implemented on database platform 910. In some embodiments, database servers 914 implement a relational database management system (RDMS) or object-oriented database management system (OODBMS) that facilitates storage and retrieval of information against data storage 912. In various cases, database servers 914 may communicate with each other to facilitate the processing of transactions. For example, database server 914A may communicate with database server 914N to determine if database server 914N has written a database record into its in-memory buffer for a particular key.

Application platform 920, in various embodiments, is a combination of hardware elements and software routines that implement and execute CRM software applications as well as provide related data, code, forms, web pages and other information to and from user systems 950 and store related data, objects, web page content, and other tenant information via database platform 910. In order to facilitate these services, in various embodiments, application platform 920 communicates with database platform 910 to store, access, and manipulate data. In some instances, application platform 920 may communicate with database platform 910 via different network connections. For example, one application server 922 may be coupled via a local area network and another application server 922 may be coupled via a direct network link. Transfer Control Protocol and Internet Protocol (TCP/IP) are exemplary protocols for communicating between application platform 920 and database platform 910, however, it will be apparent to those skilled in the art that other transport protocols may be used depending on the network interconnect used.

Application servers 922, in various embodiments, are hardware elements, software routines, or a combination thereof capable of providing services of application platform 920, including processing requests received from tenants of MTS 900. Application servers 922, in various embodiments, can spawn environments 924 that are usable for various purposes, such as providing functionality for developers to develop, execute, and manage applications (e.g., business logic). Data may be transferred into an environment 924 from another environment 924 and/or from database platform 910. In some cases, environments 924 cannot access data from other environments 924 unless such data is expressly shared. In some embodiments, multiple environments 924 can be associated with a single tenant.

Application platform 920 may provide user systems 950 access to multiple, different hosted (standard and/or custom) applications, including a CRM application and/or applications developed by tenants. In various embodiments, application platform 920 may manage creation of the applications, testing of the applications, storage of the applications into database objects at data storage 912, execution of the applications in an environment 924 (e.g., a virtual machine of a process space), or any combination thereof. In some embodiments, application platform 920 may add and remove application servers 922 from a server pool at any time for any reason, there may be no server affinity for a user and/or organization to a specific application server 922. In some embodiments, an interface system (not shown) implementing a load balancing function (e.g., an F5 Big-IP load balancer) is located between the application servers 922 and the user systems 950 and is configured to distribute requests to the application servers 922. In some embodiments, the load balancer uses a least connections algorithm to route user requests to the application servers 922. Other examples of load balancing algorithms, such as are round robin and observed response time, also can be used. For example, in certain embodiments, three consecutive requests from the same user could hit three different servers 922, and three requests from different users could hit the same server 922.

In some embodiments, MTS 900 provides security mechanisms, such as encryption, to keep each tenant's data separate unless the data is shared. If more than one server 914 or 922 is used, they may be located in close proximity to one another (e.g., in a server farm located in a single building or campus), or they may be distributed at locations remote from one another (e.g., one or more servers 914 located in city A and one or more servers 922 located in city B). Accordingly, MTS 900 may include one or more logically and/or physically connected servers distributed locally or across one or more geographic locations.

One or more users (e.g., via user systems 950) may interact with MTS 900 via network 940. User system 950 may correspond to, for example, a tenant of MTS 900, a provider (e.g., an administrator) of MTS 900, or a third party. Each user system 950 may be a desktop personal computer, workstation, laptop, PDA, cell phone, or any Wireless Access Protocol (WAP) enabled device or any other computing device capable of interfacing directly or indirectly to the Internet or other network connection. User system 950 may include dedicated hardware configured to interface with MTS 900 over network 940. User system 950 may execute a graphical user interface (GUI) corresponding to MTS 900, an HTTP client (e.g., a browsing program, such as Microsoft's Internet Explorer™ browser, Google's Chrome™ browser, Opera's browser, or a WAP-enabled browser in the case of a cell phone, PDA or other wireless device, or the like), or both, allowing a user (e.g., subscriber of a CRM system) of user system 950 to access, process, and view information and pages available to it from MTS 900 over network 940. Each user system 950 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 900 or other systems or servers. As discussed above, disclosed embodiments are suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

Because the users of user systems 950 may be users in differing capacities, the capacity of a particular user system 950 might be determined one or more permission levels associated with the current user. For example, when a salesperson is using a particular user system 950 to interact with MTS 900, that user system 950 may have capacities (e.g., user privileges) allotted to that salesperson. But when an administrator is using the same user system 950 to interact with MTS 900, the user system 950 may have capacities (e.g., administrative privileges) allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level. There may also be some data structures managed by MTS 900 that are allocated at the tenant level while other data structures are managed at the user level.

In some embodiments, a user system 950 and its components are configurable using applications, such as a browser, that include computer code executable on one or more processing elements. Similarly, in some embodiments, MTS 900 (and additional instances of MTSs, where more than one is present) and their components are operator configurable using application(s) that include computer code executable on processing elements. Thus, various operations described herein may be performed by executing program instructions stored on a non-transitory computer-readable medium and executed by processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the disclosed embodiments can be implemented in any programming language that can be executed on a server or server system such as, for example, in C, C+, HTML, JAVA, JAVASCRIPT, or any other scripting language, such as VBScript.

Network 940 may be a LAN (local area network), WAN (wide area network), wireless network, point-to-point network, star network, token ring network, hub network, or any other appropriate configuration. The global internetwork of networks, often referred to as the "Internet" with a capital "I," is one example of a TCP/IP (Transfer Control Protocol and Internet Protocol) network. It should be understood, however, that the disclosed embodiments may utilize any of various other types of networks.

User systems 950 may communicate with MTS 900 using TCP/IP and, at a higher network level, use other common Internet protocols to communicate, such as HTTP, FTP, AFS, WAP, etc. For example, where HTTP is used, user system 950 might include an HTTP client commonly referred to as a "browser" for sending and receiving HTTP messages from an HTTP server at MTS 900. Such a server might be implemented as the sole network interface between MTS 900 and network 940, but other techniques might be used as well or instead. In some implementations, the interface between MTS 900 and network 940 includes load sharing functionality, such as round-robin HTTP request distributors to balance loads and distribute incoming HTTP requests evenly over a plurality of servers.

In various embodiments, user systems 950 communicate with application servers 922 to request and update system-level and tenant-level data from MTS 900 that may require one or more queries to data storage 912. In some embodiments, MTS 900 automatically generates one or more SQL statements (the SQL query) designed to access the desired information. In some cases, user systems 950 may generate requests having a specific format corresponding to at least a portion of MTS 900. As an example, user systems 950 may request to move data objects into a particular environment 924 using an object notation that describes an object relationship mapping (e.g., a JAVASCRIPT object notation mapping) of the specified plurality of objects.

Exemplary Computer System

Figure 10:
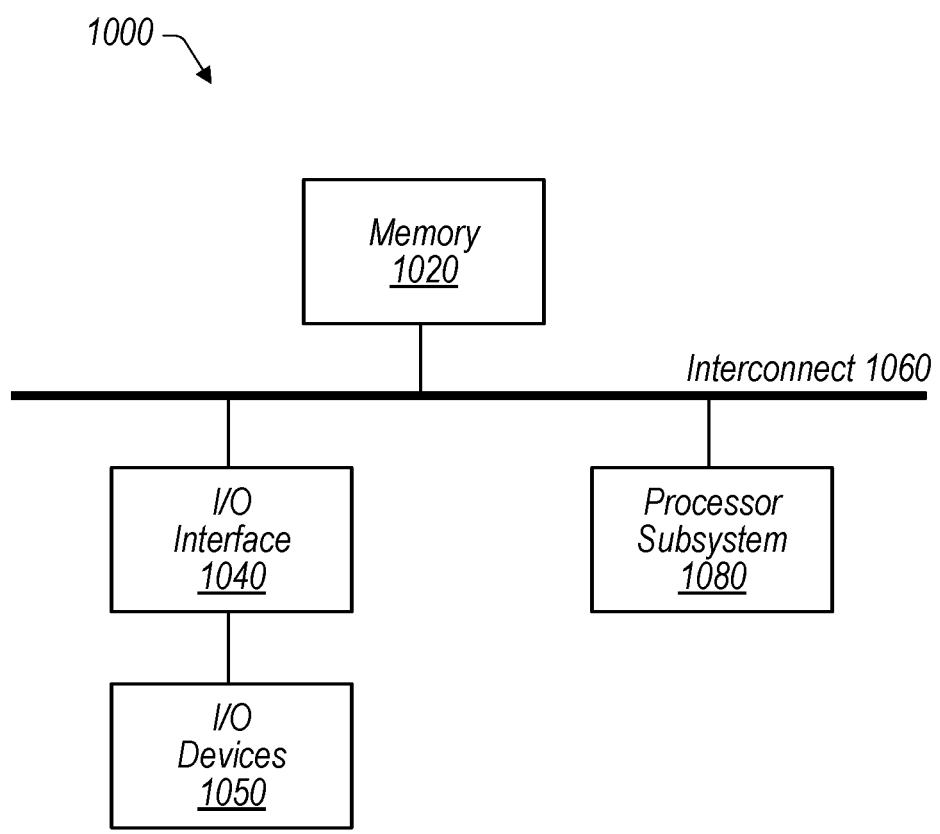
FIG. 10 is a block diagram of a computer system that may be used to implement portions of a database system that utilizes virtual partitioning schemes.

Turning now to FIG. 10, a block diagram of an exemplary computer system 1000 is depicted. Computer system 1000 may be used to implement various components of the database systems described above, and includes a processor subsystem 1080 that is coupled to a system memory 1020 and I/O interfaces(s) 1040 via an interconnect 1060 (e.g., a system bus). I/O interface(s) 1040 is coupled to one or more I/O devices 1050. Although a single computer system 1000 is shown in FIG. 10 for convenience, system 1000 may also be implemented as two or more computer systems operating together.

Processor subsystem 1080 may include one or more processors or processing units. In various embodiments of computer system 1000, multiple instances of processor subsystem 1080 may be coupled to interconnect 1060. In various embodiments, processor subsystem 1080 (or each processor unit within 1080) may contain a cache or other form of on-board memory.

System memory 1020 is usable store program instructions executable by processor subsystem 1080 to cause system 1000 perform various operations described herein. System memory 1020 may be implemented using different physical memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 1000 is not limited to primary storage such as memory 1020. Rather, computer system 1000 may also include other forms of storage such as cache memory in processor subsystem 1080 and secondary storage on I/O Devices 1050 (e.g., a hard drive, storage array, etc.). In some embodiments, these other forms of storage may also store program instructions executable by processor subsystem 1080.

I/O interfaces 1040 may be any of various types of interfaces configured to couple to and communicate with other devices, according to various embodiments. In one embodiment, I/O interface 1040 is a bridge chip (e.g., Southbridge) from a front-side to one or more back-side buses. I/O interfaces 1040 may be coupled to one or more I/O devices 1050 via one or more corresponding buses or other interfaces. Examples of I/O devices 1050 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 1000 is coupled to a network via a network interface device 1050 (e.g., configured to communicate over WiFi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

What is claimed is:

1. A method, comprising:
   receiving, by a computer system, a request for a database operation to be performed on data organized into a plurality of logical partitions within a physical partition of a database, wherein logical partitions within the plurality of logical partitions have respective partition keys;
   identifying, by the computer system, a virtual partitioning scheme for the database operation, the virtual partitioning scheme defining a first grouping of the plurality of logical partitions into a first set of two or more sub-groups such that:
      a given logical partition of the plurality of logical partitions is included in one of the first set of sub-groups; and
      at least one sub-group of the first set of sub-groups includes two or more logical partitions;
   performing, by the computer system, the database operation for logical partitions corresponding to a particular sub-group of the first set of sub-groups defined by the virtual partitioning scheme;
   repeating, by the computer system, performing of the database operation for logical partitions in another one of the first set of sub-groups, wherein the repeating is performed on remaining ones of the first set of sub-groups until the database operation has been performed on all of the plurality of logical partitions; and using a different virtual partitioning scheme that defines a second, different grouping of the plurality of logical partitions for a subsequent database operation, wherein the different virtual partitioning scheme is used without modifying the data or logical partitioning of the physical partition.

2. The method of claim 1, wherein the database is an instance of the database that has a single physical partition.

3. The method of claim 1, wherein the database has multiple physical partitions, and wherein the physical partition is included within a container that corresponds to one of the multiple physical partitions.

4. The method of claim 1, wherein the database is a multi-tenant database, and wherein ones of the plurality of logical partitions correspond to different tenants of the multi-tenant database having different partition keys.

5. The method of claim 1, wherein the physical partition of the database includes a plurality of database nodes, and wherein identifying the virtual partitioning scheme includes dynamically creating the virtual partitioning scheme based on a current node affinity of the plurality of database nodes.

6. The method of claim 1,
wherein the virtual partitioning scheme and the different virtual partitioning scheme are both available for use at the same time.

7. The method of claim 6, wherein the virtual partitioning scheme and the different virtual partitioning scheme include different numbers of virtual partitions.

8. The method of claim 1, further comprising creating a new virtual partitioning scheme while the database operation is being performed.

9. The method of claim 1, wherein the virtual partitioning scheme specifies a particular number of virtual partitions, and wherein creating the virtual partitioning scheme includes setting boundary points for the plurality of logical partitions to attempt to divide the plurality of logical partitions equally between the particular number of virtual partitions.

10. The method of claim 1, wherein the virtual partitioning scheme specifies a particular number of virtual partitions, and wherein creating the virtual partitioning scheme includes setting boundary points for the plurality of logical partitions to attempt to distribute data amounts in the physical partition equally between the particular number of virtual partitions.

11. The method of claim 1, wherein the identifying includes:
retrieving, from a local cache on an application server that receives the request, a number of virtual partitions specified in the identified virtual partitioning scheme; and
retrieving, from a central cache on a database server for the database, bound information for various ones of the number of virtual partitions, wherein the bound information for a given virtual partition is usable to identify a particular sub-group of logical partitions for the given virtual partition.

12. A non-transitory, computer-readable storage medium having program instructions stored thereon that are capable of causing a database system to perform operations comprising:
storing a database object that includes data for a plurality of tenants;
identifying a first virtual partition scheme that apportions the plurality of tenants into a plurality of virtual partitions such that each tenant is included in a single one of the plurality of virtual partitions and a particular virtual partition of the plurality of virtual partitions includes two or more tenants;
receiving a request to perform a database operation for the particular virtual partition of the first virtual partition scheme;
performing the database operation on particular data included in the database object that corresponds to those tenants apportioned to the particular virtual partition;
for each remaining virtual partition in the first virtual partition scheme, performing the database operation on data included in the database object that corresponds to those tenants apportioned to a current remaining virtual partition; and
subsequently utilizing a second virtual partition scheme with a different apportioning of tenants into a second plurality of virtual partitions to perform a subsequent database operation, wherein, under the different apportioning, each tenant is included in a single one of the second plurality of virtual partitions and one of the second plurality of virtual partitions includes two or more tenants.

13. The non-transitory, computer-readable storage medium of claim 12, wherein the database object is stored on a plurality of database nodes, and wherein the operations further comprise:
in response to a change in node affinity of the plurality of tenants relative to the plurality of database nodes, creating the second virtual partition scheme.

14. The non-transitory, computer-readable storage medium of claim 12, wherein the particular virtual partition specifies bounds, and wherein performing the database operation includes identifying those tenants apportioned to the particular virtual partition by determining which tenants have identifiers that fall within the specified bounds.

15. The non-transitory, computer-readable storage medium of claim 12, and wherein the operations further comprise:
for each tenant apportioned to the particular virtual partition, executing a specified query against data of that tenant.

16. The non-transitory, computer-readable storage medium of claim 15, wherein a particular one of the plurality of tenants is located in a different virtual partition under the first virtual partition scheme than under the second virtual partition scheme.

17. A method, comprising:
receiving, by a computer system, a request for a database operation to be performed on data stored in a portion of a multi-tenant database, wherein the data is for a group of tenants, and wherein the portion of the database does not have multiple physical partitions;
performing, by the computer system, the database operation for at least two tenants apportioned to a particular virtual partition of a first virtual partition scheme defining a first plurality of virtual partitions, wherein a given tenant of the group of tenants is included in a single virtual partition of the first plurality of virtual partitions, at least one of which includes at least two tenants; and
repeating, by the computer system for remaining virtual partitions within the first virtual partition scheme, the database operation, wherein repeating the database operation for a given one of the remaining virtual partitions includes performing the database operation for those tenants apportioned to the given remaining virtual partition; and subsequently utilizing a second, different virtual partition scheme to perform a subsequent database operation, wherein the second virtual partition scheme defines a second plurality of virtual partitions, and wherein a given tenant of the group of tenants is included in a single virtual partition of the second plurality of virtual partitions, at least one of which includes at least two tenants.

18. The method of claim 17, wherein the request specifies virtual partitioning criteria, and wherein the method further comprises:

using the virtual partitioning criteria to search a local cache stored on an application server for a particular virtual partitioning scheme that meets the specified virtual partitioning criteria; and in response to the local cache not storing a virtual partitioning scheme that meets the virtual partitioning criteria, expanding the search to a central cache of virtual partitioning schemes stored on a database server.

19. The method of claim 18, wherein the local cache stores an indication of a number of virtual partitions for a given virtual partitioning scheme, and wherein the central cache stores bound information indicating ranges of tenants included within each virtual partition in the given virtual partitioning scheme.

20. The method of claim 17, further comprising:

storing bound information indicating ranges of tenants included within each virtual partition in the first virtual partitioning scheme; and in response to a change in a node affinity of tenants of the group of tenants of the multi-tenant database, changing the bound information of at least one virtual partition specified by the first virtual partitioning scheme.

\* \* \* \* \*